(12) United States Patent
Caspi et al.

(10) Patent No.: US 7,545,783 B2
(45) Date of Patent: *Jun. 9, 2009

(54) SYSTEM AND METHOD FOR USING PRESENCE TO CONFIGURE AN ACCESS POINT

(75) Inventors: Rami Caspi, Sunnyvale, CA (US); William J. Beyda, Cupertino, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 589 days.

This patent is subject to a terminal disclaimer.

(21) Appl. No.: 10/952,132

(22) Filed: Sep. 27, 2004

(65) Prior Publication Data

US 2006/0067285 A1     Mar. 30, 2006

(51) Int. Cl.
*H04Q 7/24* (2006.01)

(52) U.S. Cl. .................. 370/338; 370/352; 370/401; 455/422.1; 455/445

(58) Field of Classification Search ............. 370/329, 370/337, 338, 352, 401, 328; 455/425, 455, 455/422, 558, 422.1, 445

See application file for complete search history.

(56) References Cited

U.S. PATENT DOCUMENTS

| | | | |
|---|---|---|---|
| 5,566,226 A * | 10/1996 | Mizoguchi et al. ........... | 455/558 |
| 6,658,095 B1 | 12/2003 | Yoakam | |
| 6,757,722 B2 | 6/2004 | Lonnfors et al. | |
| 6,879,574 B2 * | 4/2005 | Naghian et al. ............ | 370/338 |
| 6,957,069 B2 * | 10/2005 | Shah et al. .................. | 455/436 |
| 6,970,547 B2 | 11/2005 | Andrews et al. | |
| 7,058,040 B2 * | 6/2006 | Schmidt ...................... | 370/337 |
| 7,194,283 B2 * | 3/2007 | Kardach et al. ........... | 455/552.1 |
| 7,298,751 B1 * | 11/2007 | Baker et al. ................. | 370/401 |
| 2002/0071416 A1 | 6/2002 | Carlson et al. | |
| 2004/0059781 A1 | 3/2004 | Yoakum et al. | |
| 2004/0062383 A1 | 4/2004 | Sylvain | |
| 2004/0122901 A1 | 6/2004 | Sylvain | |
| 2004/0125941 A1 | 7/2004 | Yoakum et al. | |

(Continued)

FOREIGN PATENT DOCUMENTS

EP       1 215 853 A2    6/2002

(Continued)

OTHER PUBLICATIONS

International Search Report for PCT/US2005/024722, Dated Oct. 21, 2005.

(Continued)

*Primary Examiner*—CongVan Tran

(57) ABSTRACT

A telecommunications system includes a wireless packet network; a cellular telephone network; at least one computing device including a wireless network interface card for communicating over the wireless packet network; at least one cellular telephone device, the cellular telephone device having a cellular telephone mode for communicating over the cellular network and a packet network mode for communicating over the packet network; a presence server on said packet network; wherein the cellular telephone device is configured to function as a wireless access point for said at least one computing device by interfacing the wireless network interface card to the wireless packet network via the cellular network; wherein the presence server communicates with said at least one cellular telephone device to activate and deactivate said wireless access point based on a presence status.

19 Claims, 13 Drawing Sheets

U.S. PATENT DOCUMENTS

| | | |
|---|---|---|
| 2004/0179512 A1 | 9/2004 | Leblanc et al. |
| 2004/0203836 A1 | 10/2004 | Gorday |
| 2004/0220995 A1 | 11/2004 | Tsutsumi |
| 2005/0135302 A1* | 6/2005 | Wang et al. ............... 370/329 |
| 2005/0177515 A1* | 8/2005 | Kalavade et al. ............. 705/52 |
| 2005/0190747 A1* | 9/2005 | Sindhwani et al. .......... 370/352 |
| 2005/0226178 A1* | 10/2005 | Forand et al. ............... 370/328 |
| 2006/0172769 A1 | 8/2006 | Oh |

FOREIGN PATENT DOCUMENTS

| | | |
|---|---|---|
| WO | WO 01/52513 A1 | 7/2001 |

OTHER PUBLICATIONS

Bar-Shalom, et al., "On the Union of WPAN and WLAN in Mobile Computers and Hand-Held Devices," Intel Technology Journal, vol. 07, No. 03., pp. 20-36, 2003.

* cited by examiner

SYSTEM AND METHOD FOR USING PRESENCE TO CONFIGURE AN ACCESS POINT

CROSS REFERENCE TO RELATED APPLICATIONS

This application is related to commonly-assigned, co-pending application Ser No. 10/952,306, titled, SYSTEM AND METHOD FOR OPTIMIZING MOBILITY ACCESS; application Ser. No. 10/952,133, titled, SYSTEM AND METHOD FOR USING AN EMBEDDED MOBILITY ALGORITHM; application Ser. No. 10/952,134, titled, SYSTEM AND METHOD FOR CELLULAR TELEPHONE NETWORK ACCESS POINT; and application Ser. No. 10/952,307, titled SYSTEM AND METHOD FOR SETTING PRESENCE STATUS BASED ON ACCESS POINT USAGE.

FIELD OF THE INVENTION

The present invention relates to telecommunications systems and, in particular, to a wireless network access system.

BACKGROUND OF THE INVENTION

Multiple mode cellular telephones are becoming increasingly popular. Such cellular telephones typically provide a cellular telephone interface for communicating on the cellular telephone network, and an 802.11 wireless network interface.

The cellular telephone interface allows standard telephone connectivity through the cellular and public switched telephone networks. The 802.11 wireless network interface allows the user to access the Internet or corporate Intranet using the cell phone. In addition, it allows the user voice communication via a voice over Internet protocol (VoIP) over a packet network. This may be advantageous, for example, in the context of a corporate campus, in which using the cellular network would be considerably more expensive than using the local Intranet. However, even when allowing Internet access, cellular telephones typically provide a relatively awkward user interface.

Laptop computers are increasingly being provided with wireless network interface access cards as a default option. Such wireless network access interface cards typically employ a wireless local area network (LAN) protocol, such as one of the "flavors" of IEEE 802.11 (e.g., 802.11a/b/e/g). Using their laptops and such wireless network access interface cards, users can employ public wireless network access points, also known as "hot spots," to access the Internet and private Intranets.

As can be appreciated, however, when either the laptop or the cellular telephone 802.11 interface is out of range of a hot spot, wireless network access cannot be accomplished.

As such, there is a need for an improved system and method for wireless network access.

SUMMARY OF THE INVENTION

These and other drawbacks in the prior art are overcome in large part by a system and method according to embodiments of the present invention.

A wireless telephone according to an embodiment of the present invention includes a cellular telephone controller configured to interface the cellular telephone to a telephone network; a wireless packet network controller configured to interface the wireless telephone to packet network; and a wireless network access point controller configured to interface a computer to said packet network via telephone network.

A telecommunications system according to embodiments of the present invention includes a wireless packet network; a cellular telephone network; at least one computing device including a wireless network interface card for communicating over the wireless packet network; at least cellular telephone device, the cellular telephone device having a cellular telephone mode for communicating over the cellular network and a packet network mode for communicating over the packet network; wherein the cellular telephone device is configured to function as a wireless access point for said at least one computing device by interfacing the wireless network interface card to the wireless packet network via the cellular network.

A telecommunications processing device according to an embodiment of the present invention includes a wireless network interface; and a processor operably coupled to an auto detect module configured to maintain a prioritized WiFi network connection list; wherein said processor is programmed to attempt access a wireless packet network using said wireless network interface via a wireless network access point defined on said prioritized WiFi network connection list in a first mode and is programmed to access the wireless packet network using said wireless network interface via a cellular telephone programmed to function as a wireless network access point in a second mode.

A telecommunications method according to embodiments of the present invention includes configuring a WiFi connection list at a telecommunications processing device; selectively attempting to connect to a wireless packet network using listed wireless access point connections; and attempting to connect to said wireless access point using a cellular telephone as a wireless access point if a listed wireless access point connection is determined to be unavailable.

A wireless telephone according to embodiments of the present invention includes a cellular telephone controller configured to interface the cellular telephone to a telephone network; a wireless packet network controller configured to interface the wireless telephone to one or more packet networks for voice over IP voice connection; and a wireless network access point controller configured to function as a wireless access point for interfacing a computer to said packet network via the telephone network; wherein the wireless packet network controller is configured to turn off a function of the wireless network access point controller if a packet network is detected. According to some embodiments, the wireless packet network controller is configured to turn on a function of the network access point controller if a packet network is not available.

According to embodiments of the present invention, a wireless telephone is provided having a voice over IP controller for voice communication over a packet network and a cellular network controller for voice communication over a cellular telephone network, the wireless telephone configured to function as a cellular wireless network interface, wherein said wireless telephone is configured to implement a wireless access point function so as to interface a computer equipped with a wireless network interface to a packet network via the cellular telephone network; wherein said voice over IP controller is configured to turn off said wireless access point function if a packet network is not found.

A telecommunications system according to embodiments of the present invention includes a wireless packet network; a cellular telephone network; at least one computing device including a wireless network interface card for communicating over the wireless packet network; at least one cellular telephone device, the cellular telephone device having a cellular telephone mode for communicating over the cellular network and a packet network mode for communicating over the packet network; a presence server on said packet network; wherein the cellular telephone device is configured to function as a wireless access point for said at least one computing device by interfacing the wireless network interface card to the wireless packet network via the cellular network; wherein the presence server communicates with said at least one cellular telephone device to activate and deactivate said wireless access point based on a presence status.

A wireless telephone according to embodiments of the present invention includes a cellular telephone controller configured to interface the cellular telephone to a telephone network; a wireless packet network controller configured to interface the wireless telephone to one or more packet networks for voice over IP voice connection; and a wireless network access point controller configured to function as a wireless access point for interfacing a computer to said packet network via the telephone network; wherein the wireless packet network controller is configured to turn on and off a function of the wireless network access point controller responsive to a presence status of a user.

A telecommunications system according to embodiments of the present invention includes a wireless packet network; a cellular telephone network; at least one computing device including a wireless network interface card for communicating over the wireless packet network; at least one cellular telephone device, the cellular telephone device having a cellular telephone mode for communicating over the cellular network and a packet network mode for communicating over the packet network; a presence server on said packet network; wherein the cellular telephone device is configured to function as a wireless access point for said at least one computing device by interfacing the wireless network interface card to the wireless packet network via the cellular network; wherein a presence status of a user is set at said presence server based on whether the at least one cellular telephone device has activated said wireless access point.

A better understanding of these and other specific embodiments of the invention is obtained when the following detailed description is considered in conjunction with the following drawings.

DETAILED DESCRIPTION OF EMBODIMENTS OF THE INVENTION

Figure 1:
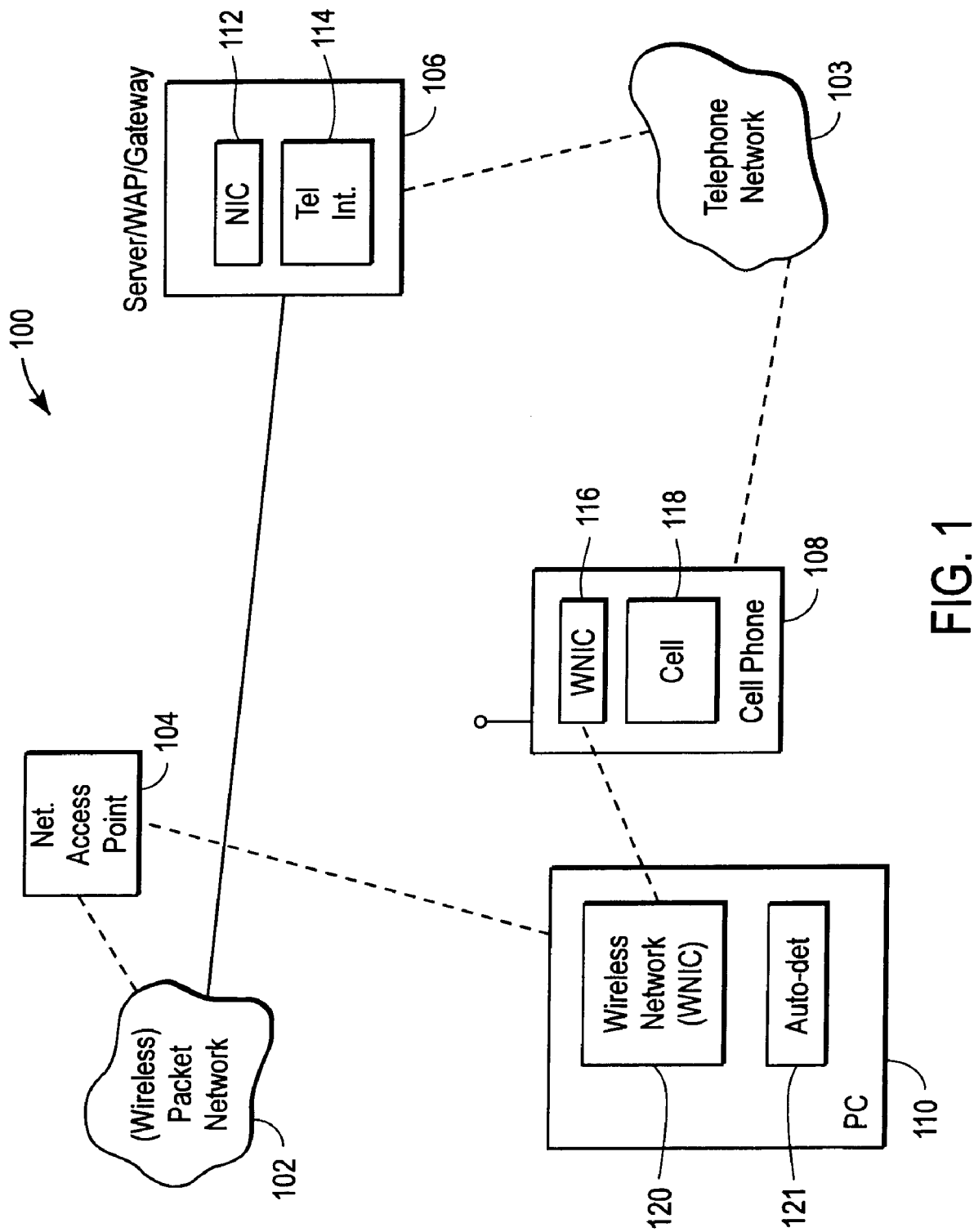
FIG. 1 illustrates a telecommunication system according to an embodiment of the present invention.

Turning now to the drawings and, with particular attention to FIG. 1, a diagram of an exemplary telecommunications system 100 according to an embodiment of the present invention is shown. Shown is a network 102. The network 102 may be a packet network, such as a wireless packet network, or may be implemented as a wired network having one or more wireless access points, such as wireless access point 104. Similarly, the packet network 102 may be implemented as the Internet or a corporate Intranet. Thus, the packet network 102 may be implemented using a TCP/IP network and may implement voice or multimedia over IP using, for example, the Session Initiation Protocol (SIP) or ITU Recommendation H.323. Suitable wireless technologies include, e.g., the IEEE 802.11x standards.

A server 106 may couple to the network 102. The server 106 may be associated with the user's enterprise or may be a public network service provider server, and may provide a gateway to external networks or private branch exchanges (PBXs) and include one or more network interfaces 112, such as packet network interfaces, and one or more telephone interfaces 114. Thus, the server may be equipped to provide VoIP capabilities on the network.

Various user devices, such as personal and laptop computers, PDAs, and the like, may couple to or be in communication with the packet network 102. Such devices may include telephony and other multimedia messaging capability using, for example, peripheral cameras, Webcams, microphones and speakers (not shown) or peripheral telephony handsets.

A user may be equipped with a computing or processing device, such as a personal computer 110, which may be implemented as a laptop computer running the Microsoft Windows XP operating system, and a cellular telephone 108, according to embodiments of the present invention. The computer 110 may include a wireless network access card or interface 120 and a network auto-detect module 121. The user may also be provided with a wireless electronic device such as a wireless or cellular telephone 108 according to embodiments of the present invention. As shown, the cellular telephone 108 includes a wireless network controller or interface 116, such as a wireless packet network controller, and a cellular telephone controller or interface 118. The cellular telephone interface 118 may implement, for example, GSM or GPRS cellular telephony.

In operation, a user who is out of the office may access the telephone network 103 using the cellular telephone function of the telephone 108. When he is in the office or at a corporate campus location, the cell phone 108 can function in a packet network mode for voice communication, using the wireless network interface unit 116 to communicate using, e.g., any of a variety of VoIP techniques.

The user may access the packet network 102 using his laptop computer 110 in a variety of ways. In a first mode, the user's wireless network card or interface 120 will detect a private or enterprise network access point and will log in using that. In a second mode, the network interface 120 will detect a public wireless network access (WiFi) "hot spot" and can allow the user to access his private network 102 via the Internet. If neither is available, then in a third mode, the wireless network interface 120 will communicate with the cellular telephone 108 to provide a wireless access point. The cellular telephone will then access the cellular network and provide a connection via the telephone network to the packet network 102.

Figure 2:
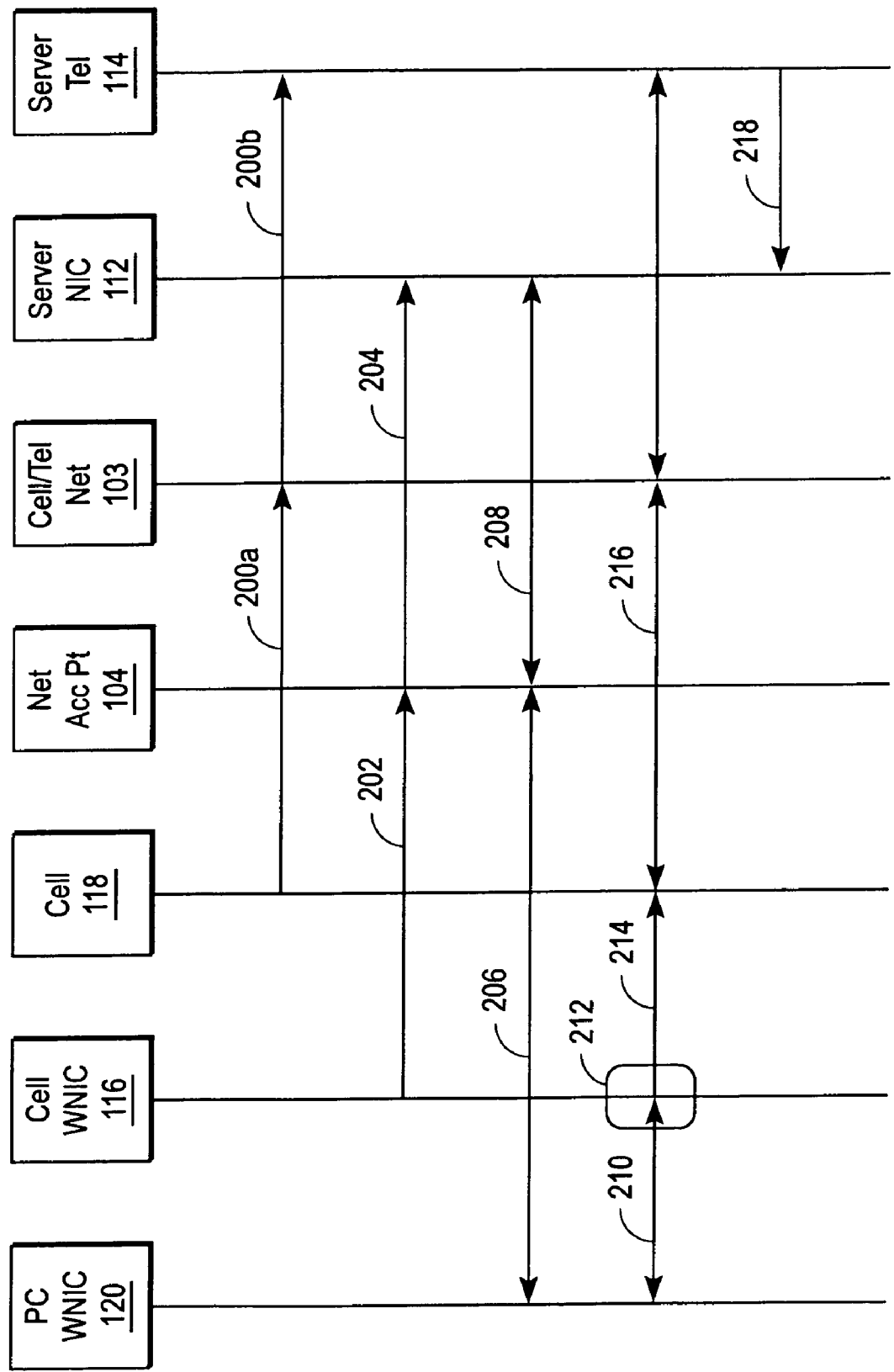
FIG. 2 is a diagram illustrating operation of an embodiment of the present invention.

Operation of an embodiment of the present invention is shown in greater detail in FIG. 2. Shown schematically are the laptop computer's wireless network interface 120; the cell phone wireless network interface 116; the cell phone cellular interface 118; a wireless network access point 104; the cellular telephone network 103; the enterprise server network interface 112; and the enterprise server telephone interface 114.

In a first mode, the cellular telephone 108 is used to make a conventional telephone call, for example, to a party on packet network 102 (It is noted, however, that the telephone call could be to anyone connected to or in communication with the public switched telephone network. Thus, the figures are exemplary only). For example, at 200a, the user dials the number and is connected to the cellular or public switched telephone network 103. The cellular network 103 then connects to the enterprise server telephone interface 114, at 200b, and the call is completed. As noted above, depending on the embodiment, the call can be completed to a telephony device on the packet network 102 or to a conventional telephone. If the call is to a user on the packet network 102, the server network interface 112 will allow communication on the network; if the call is to a conventional telephone, the server 106 may provide switching via the telephone interface 114.

In a second mode, the cellular telephone 108 is used as a VoIP telephone when a network access point is detected. The network access point 104 may be associated, for example, with an enterprise network, although in certain embodiments, could also be a public access point associated with the Internet; also, while shown as a separate unit, it may be coupled with the server 106. For example, as shown at 202, the cell phone's wireless network interface 116 connects to the network access point 104. The network access point 104 in turn can connect to the server's wireless network interface 112, at 204. Then, depending on the embodiment (i.e., whether the called party is a VoIP telephone or a conventional telephone), the call can be completed to a telephony device on the packet network 102 via the network interface 112 or to a conventional telephone via the server telephone interface 114.

Operation of the cell phone in a third mode, as wireless access point, will be discussed in greater detail below. The laptop computer 110, however, functions in a first mode to allow wireless packet network access. For example, at 206, the laptop's wireless network interface 120 detects an allowed network access point 104. Such an allowed network access point may be a public network access point that allows connection to a private network via the Internet, or may be an enterprise network access point. In the embodiment illustrated, at 208, the network access point 104 connects the user to the packet network 102, e.g., via the server network interface 112, and/or the Internet.

If either a public or a private network access point is not available, the laptop 110 can connect using the cell phone's third mode, i.e., a wireless network access point. That is, the wireless cellular interface 116 and cell interface 118 allow the user of the laptop 110 to connect to the packet network 102. Thus, at 210, the wireless network interface 120 seeks to connect to or communicate with the cellular telephone's wireless interface 116. In such a case, the cellular telephone's wireless interface 116 functions as a wireless hot spot to allow standard communication between it and the computer 110. At 212, the cell phone's wireless network interface 116 detects that the computer 110 wants to access the packet network 102; accordingly, at 214, it activates or accesses the cellular interface 118 to communicate with the network server 106. Then, at 216, the cellular interface 118 calls a number associated with the enterprise server telephone interface 114. In turn, at 218, the server telephone interface 114 communicates with the server network interface 112 to connect the user to the packet network 102. The network data from the computer 102 is packaged for and then transmitted over the cellular network by the cellular telephone 108. That is, the cellular telephone performs any necessary format conversions, compression/decompression, translations, etc., for transmission over the cellular and/or telephone networks. At the receiving end, the enterprise server unpackages the data from the cellular and/or telephone network and provides it over the packet network. A similar situation holds true for transmission to the computer from the packet network.

Figure 3:
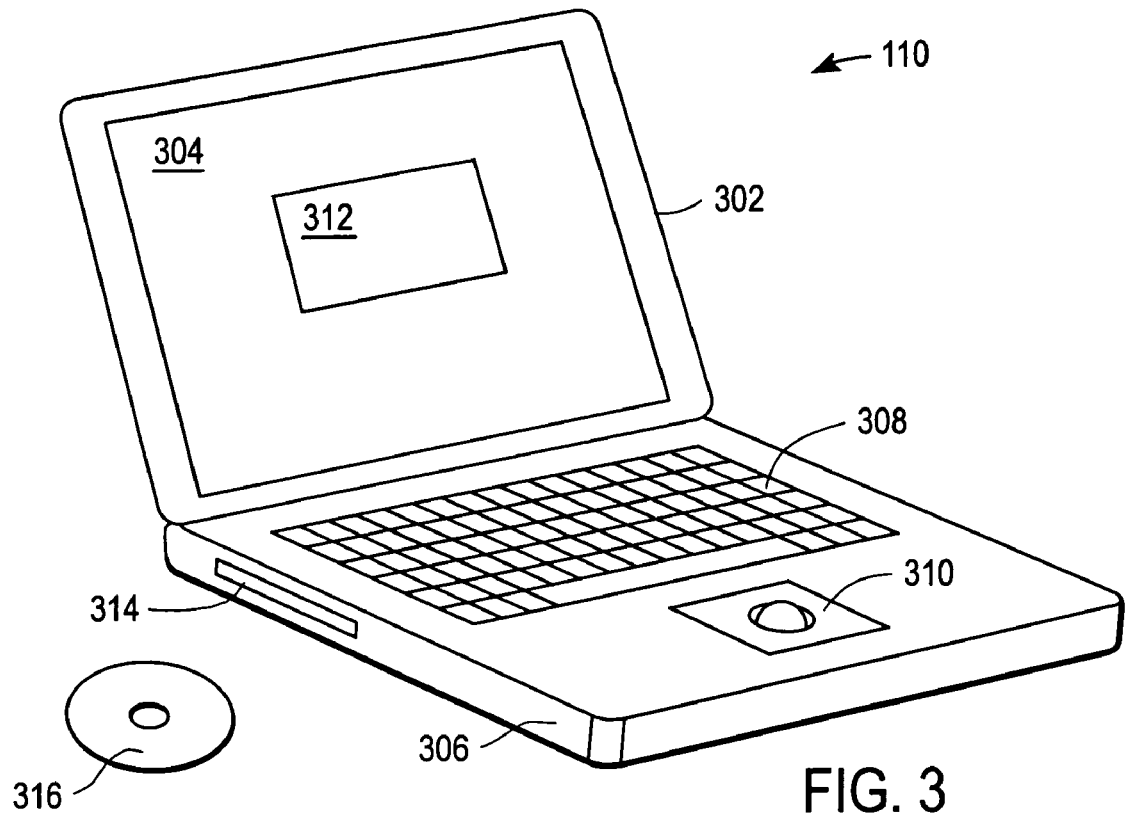
FIG. 3 and FIG. 4 illustrate an exemplary personal computer according to embodiments of the present invention.

FIG. 3 illustrates an example of a personal computer that can be used to execute embodiments of the invention. In particular, FIG. 3 shows a computer system 104 that includes a display 302, screen 304, housing 306, keyboard 308, and cursor pointing device 310. The cursor pointing device 310 can have one or more buttons for interacting with a graphical user interface (GUI), such as GUI 312. The housing 306 may house, for example, a CD/DVD RW drive 314, system memory and a hard drive (see FIG. 4) which can be utilized to store and retrieve software programs incorporating computer code that implements aspects of the invention, data for use with the invention, and the like. Although CD-ROM/DVD 316 is shown as an exemplary computer readable storage medium, other computer readable storage media including floppy disk, tape, flash memory, system memory, and hard drive can be utilized. Additionally, a data signal embodied in a carrier wave (e.g., in a network including the Internet) can be the computer readable storage medium.

Figure 4:
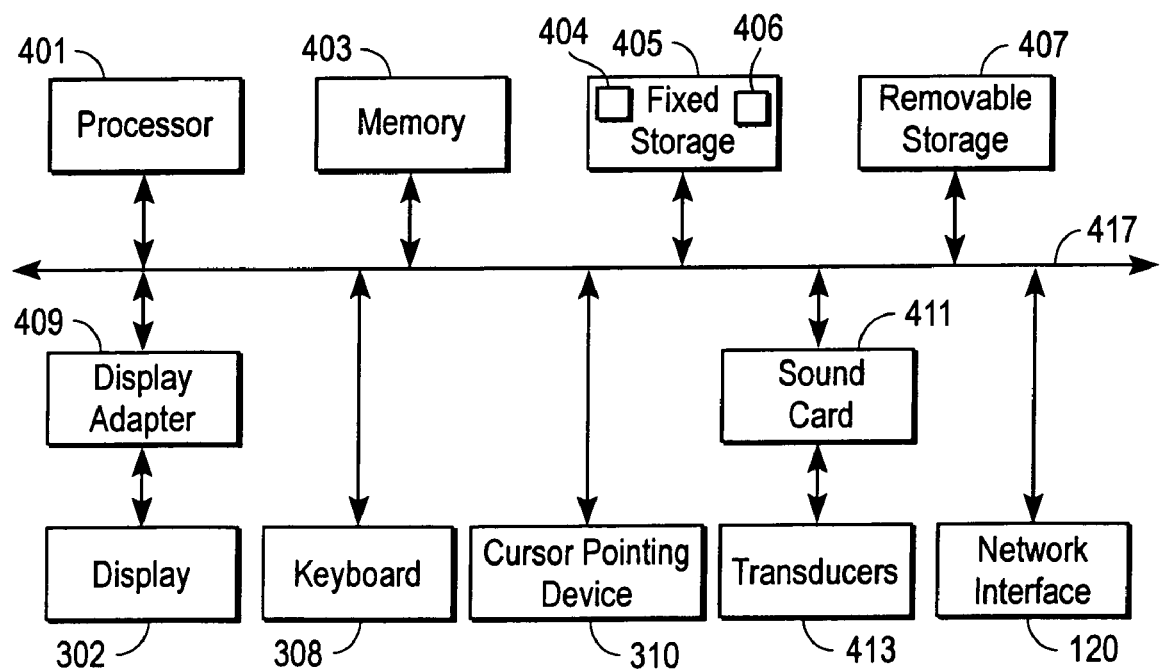

FIG. 4 shows a system block diagram of computer system 110 used to execute software of an embodiment of the invention or use hardware embodiments. As in FIG. 3, computer system 110 includes display 302, keyboard 308, and cursor pointing device 310. Computer system 110 further includes subsystems such as a central processor 401, system memory 403, fixed storage 405 (e.g., hard drive), removable storage 407 (e.g., CD-ROM drive), display adapter 409, sound card 411, transducers 413 (speakers, microphones, and the like), and network interface(s) 120. A Pentium™ microprocessor such as the Pentium III™ or IV™ microprocessor, manufactured by Intel Corporation may be used for the processor 401. Equivalent or other processors may be available from Motorola, Inc., AMD, or Sun Microsystems, Inc. The processor 401 also may be embodied as one or more microprocessors, computers, computer systems, etc The network interface 120 may provide the communication to the packet network. Thus, the network interface 120 may be a wireless interface and implement an 802.11x network interface.

Other computer systems suitable for use with the invention can include additional or fewer subsystems. For example, another computer system could include more than one processor 101 (i.e., a multi-processor system) or a cache memory.

The system bus architecture of computer system 110 is represented by arrows 417. However, these arrows are illustrative of any interconnection scheme serving to link the subsystems. For example, a local bus could be utilized to connect the central processor to the system memory and/or display adapter. Computer system 110 shown in FIG. 4 is but an example of a computer system suitable for use with the invention. Other computer architectures having different configurations of subsystems can also be utilized.

Figure 5:
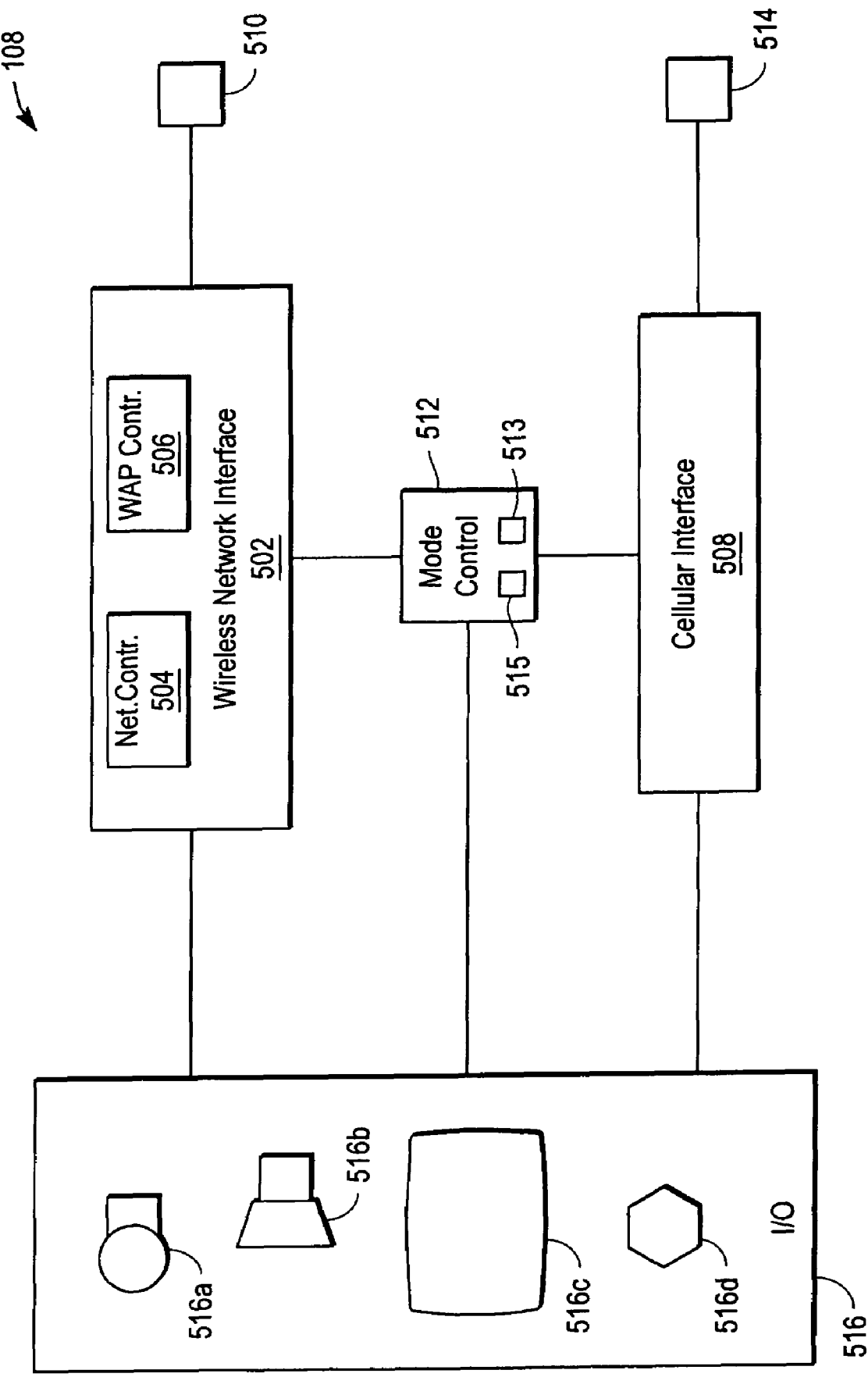
FIG. 5 illustrates an exemplary cellular telephone according to embodiments of the present invention.

Turning now to FIG. 5, a diagram of an exemplary cellular telephone 108 in accordance with embodiments of the present invention is shown. The cellular telephone 108 includes a wireless network interface controller 502 and a cellular interface controller 508. In addition, the cellular telephone includes a user interface 516 (e.g., keypad, display, microphone and speakers), and wireless packet network transceiver 510 and cellular transceiver 514.

The cellular interface controller 508 may implement any of a variety of cellular telephony protocols, including, for example, GSM, GPRS, TDMA, etc. The wireless network interface 502 my implement one of the IEEE 802.11x protocols and includes a networking controller 504 and a wireless access point controller 506. The networking controller 504 operates when the cell phone is in VoIP mode; the wireless access point controller 506 operates when the cell phone is in access point mode, as will be explained in greater detail below. More particularly, the networking controller 504 allows the cellular telephone to function as a VoIP telephone; the wireless access point controller 506 allows the cellular telephone to function as a wireless network access point or WiFi hot spot.

The cellular telephone 108 also implements a mode select unit 512, which selects between wireless network, wireless access point, and cellular modes. In addition, the mode select unit 512 may function to perform any necessary coding, decoding, modulation, demodulation, compression, decompression, translation, etc., to package and unpackage the packet network data for transmission on the cellular telephone network. While illustrated as standalone units, the various controllers 502, 504, 506, 508 and the mode select unit 512 may be embodied as various combinations of software and/or firmware running one or more processors in the cellular telephone.

Figure 6:
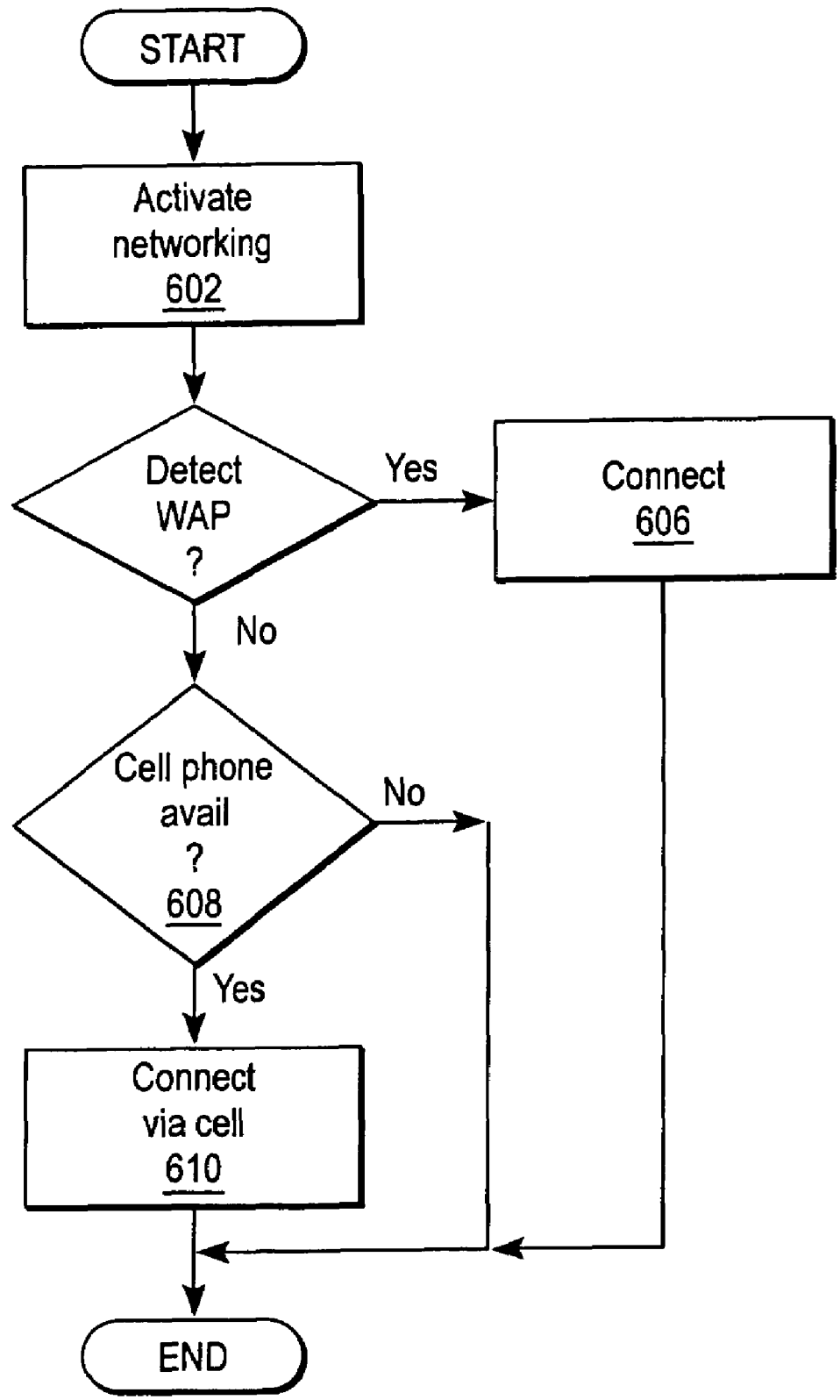
FIG. 6 is a flowchart illustrating operation of an embodiment of the present invention.

Operation of an embodiment of the present invention is shown with reference to FIG. 6. Initially, in a step 602, the user can activate a networking function or program (e.g., program 404 stored in fixed storage 405 (FIG. 4) on the personal computer 110). For example, the user can use the graphical user interface 312 (FIG. 3) to activate a networking program to access the wireless network interface 120 functions to send and receive access point signaling. In a step 604, the wireless network interface 120 can detect a wireless access point 104, for example, by "listening" for appropriate handshake signaling. As noted above, in one embodiment, the signaling is in accordance with one of the IEEE 802.11x standards. If a wireless access point 104 is detected, then in a step 606, the wireless network interface 120 will connect the computer 110 to the network 102 via the access point 104.

Otherwise, in a step 608, a determination is made of whether the cell phone access point 506 is available. If not, the computer will fail to access the network and the operation will terminate. Otherwise, in a step 610, the computer 110 will access the network 102 using the cell phone as an access point, in a manner similar to that discussed above. That is, the mode select unit 512 will cause the cell phone 108 to enter the wireless access point mode. The cell phone's wireless access point control unit 506 will then function as a WiFi hot spot for the computer 110. The mode select unit 512 also will activate the cell controller 508 to communicate with the server 106, and will perform any packaging, etc., on the sent and received data, transmitted over the cellular telephone network.

Figure 7:
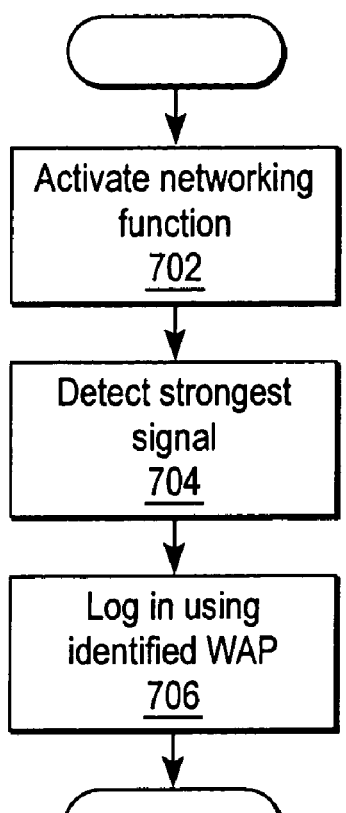
FIG. 7 is a flowchart illustrating operation of an embodiment of the present invention.

In order to find an available access point, the computer's wireless network interface 120 is equipped with an auto-detect feature 121. According to one embodiment of the present invention, the auto-detect feature 121 receives handshake signaling from wireless access points. In certain embodiments, the auto-detect feature 121 determines the access point that is transmitting at highest signal strength and connects to that one. This is shown more particularly in FIG. 7. Thus, in a step 702, the user can activate the networking function. Again, this may be accomplished using the GUI 308 of the computer 110. In a step 704, the auto-detect feature 121 determines which, if any, access point's handshake signal(s) are at highest strength. For example, the auto-detect feature 121 may perform a signal power analysis to make the determination. The auto-detect feature 121 then selects the access point associated with the highest signal power and logs in, in a step 706.

According to other embodiments of the present invention, the auto-detect feature 121 maintains a prioritized listing of approved wireless access points. Approved wireless access points can include, for example, the cell phone access point; public "hot spots," such as at airports or cafes; or the enterprise network access point(s). Such a prioritized WiFi connection listing may be stored as one or more files 406 in fixed storage 405 (FIG. 4). The auto-detect feature 121 will attempt to log in to the network by accessing access points according to the order of the prioritized list. Typically, due to the relative expense of cell phone network charges, the cell phone access point would be lowest priority. (One measure of prioritizing is a cost basis. According to such a measure, the private enterprise access points would be deemed lowest cost, followed, for example, by public access points, and then the cell phone access point).

Figure 8:
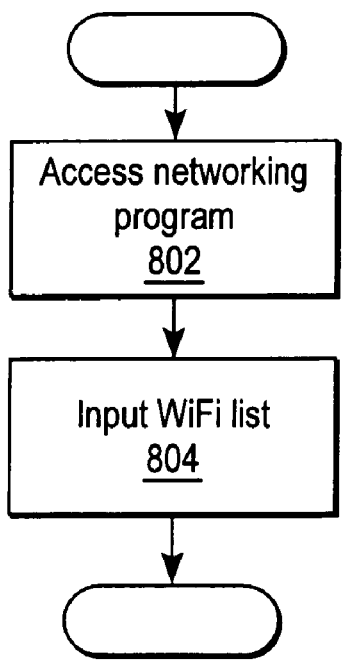
FIG. 8 is a flowchart illustrating operation of an embodiment of the present invention.

Programming the list may be done by the user with appropriate software associated with the networking program 404. This is illustrated more particularly in FIG. 8. For example, the list may be programmed by providing one or more files on a removable memory device (e.g., disk, flash memory device, etc.); using standalone software; or using a browser through an Internet or other connection to an administration web page. As shown at step 802, the user can access the networking program. At a step 804, the user can input the prioritized WiFi access point listing. This may be done, for example, manually or by the user selecting from a predetermined list of access points using, e.g., a pulldown menu, provided by any convenient source, such as those discussed above.

Figure 9:
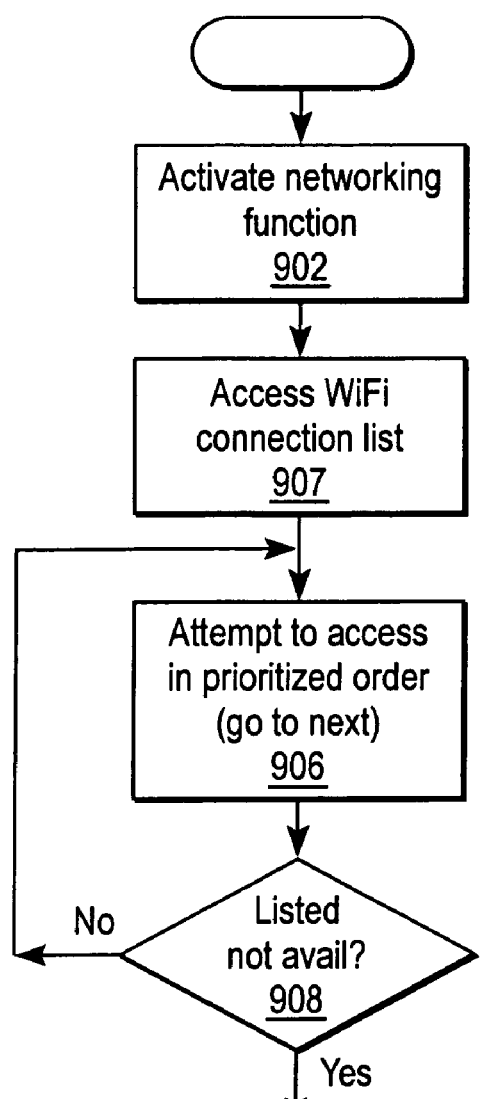
FIG. 9 is a flowchart illustrating operation of an embodiment of the present invention.

Operation of this embodiment is shown in FIG. 9. That is, FIG. 9 illustrates operation of an embodiment of the present invention in which the system uses a prioritized list to determine an access point and/or network to log on to. In a step 902, the user activates the networking function 404 (FIG. 4) on the personal computer 110. At a step 904, in response, the auto-detect feature 121 accesses the WiFi prioritized connection list 406 (FIG. 4). In a step 906, the wireless network interface 120 attempts to access a wireless access point according to the order listed. If a listed wireless access point is not available, as determined in step 908, then the computer 110's auto-detect feature 121 will attempt to access the next-listed access point, i.e., go back to step 906. If a listed point is available, then in a step 910, the computer 110 will connect through it. As noted above, in certain embodiments, the cell phone wireless access point has lowest priority.

The cellular telephone 108 itself may also be equipped to activate or turn on a function in response to lack of detection of a suitable WiFi hot spot. Thus, in certain embodiments, the mode select unit 512 (FIG. 5) of the cell phone 108 implements a search algorithm 513 to periodically search for an available 802.11 network or WiFi hot spot. If there is no such hot spot available, the cell phone can activate its wireless access point function. When one is found, the function can be deactivated. In operation, the mode select unit 512 will periodically instruct the networking control 502 to "listen" for an active network.

Figure 10:
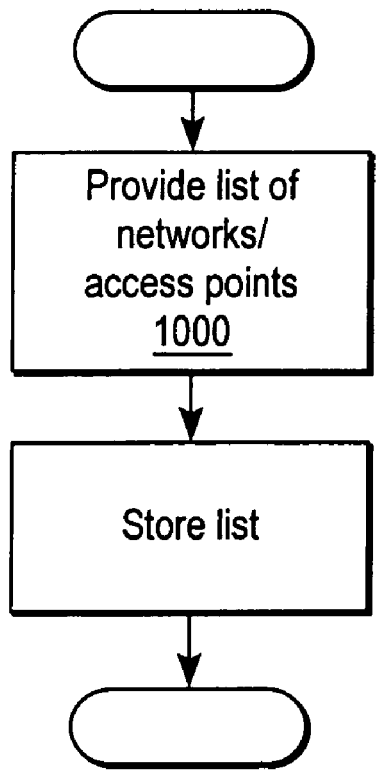
FIG. 10 is a flowchart illustrating operation of an embodiment of the present invention.

A prioritized list 515 may be provided and stored, in a manner similar to that discussed above with reference to the computer 110. That is, the cell phone can be programmed to store a prioritized list of access points the search algorithm is to "listen for." Thus, for example, as shown at FIG. 10, at a step 1000, a user may configure the telephone with a list 515 of allowed networks. Again, this list may be provided manually, or via an Internet connection, or a wired or wireless connection to a configuring computer (e.g., computer 110), such as server 106. In a step 1002, the telephone stores the list. Alternatively, a server such as server 106 may itself maintain a list and provide it to the cell phone and/or computer. For example, the server 106 may be programmed with a listing or may access the Internet for local service providers and generate a cost-based prioritized list therefrom. Such a listing can then be uploaded to the computer and/or telephone.

Figure 11:
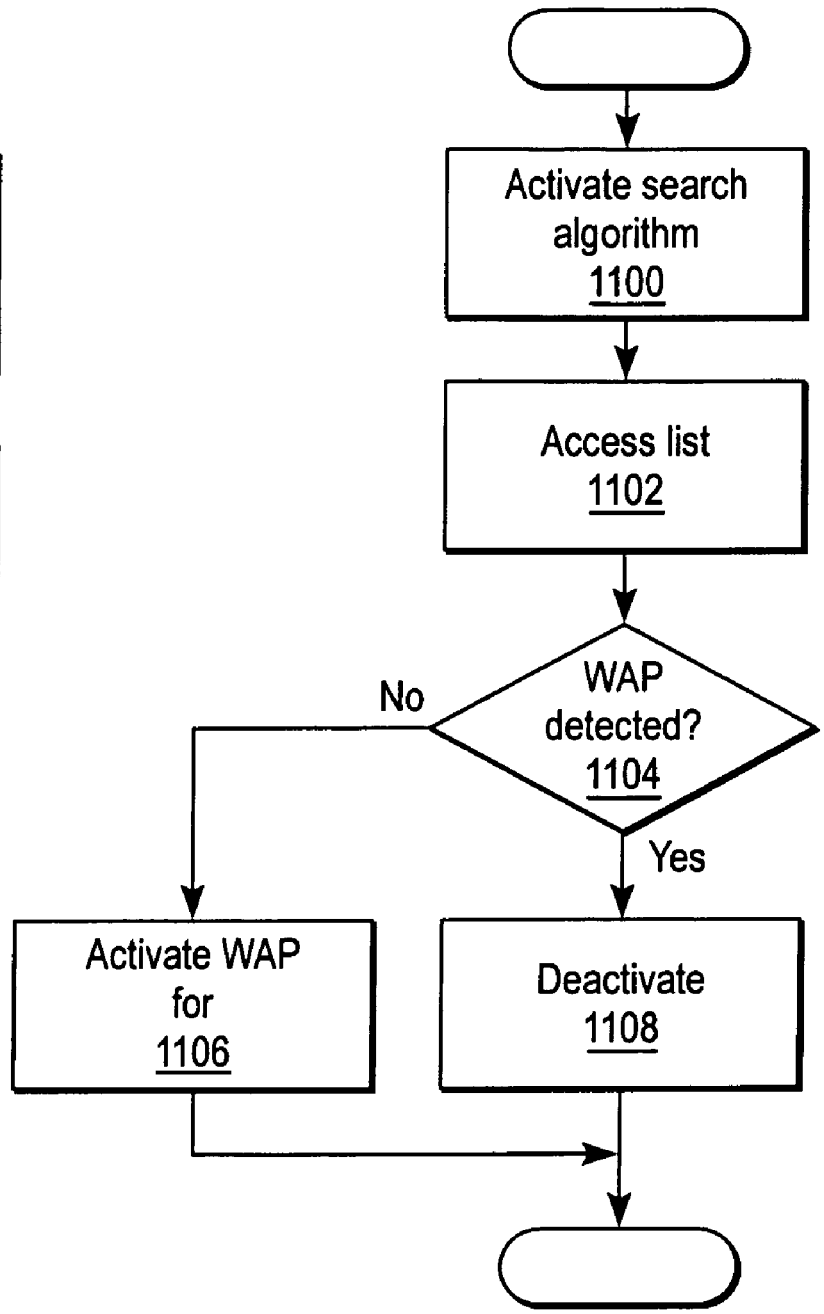
FIG. 11 is a flowchart illustrating operation of an embodiment of the present invention.

Operation of an embodiment of the present invention is shown in FIG. 11. In particular, FIG. 11 shows operation of the cellular telephone 108's search and activation/deactivation function 513 according to embodiments of the present invention. In a step 1100, the mode select unit 512 activates the search control 513. The search control 513 can then search for any available access point, or can include the cell phone accessing a prioritized access point list 515, as shown at step 1102. If, as determined at a step 1104, an available access point is detected, then the cell phone's wireless access point function is deactivated, in a step 1108. In this case, the found network access point is used in conjunction with the network controller to provide VoIP functionality. Otherwise, it is activated, in step 1106.

The access point mode of the cellular telephone 108 may be used in conjunction with a presence-based telecommunication network. For example, in certain embodiments, the cell phone access point mode can be set based upon presence states or contexts. Similarly, the activity of the cell phone wireless access mode can be used to set a particular network presence state. For example, in operation, the personal computer 110 may "listen" for wireless access point signaling and, in particular, for the wireless access point transmitting with highest signal strength. If the user is in the office, it is possible for the cellular telephone wireless access point to be that access point. It may be disadvantageous to use the cellular wireless access point, however, due to cellular telephone network charges. Consequently, embodiments of the present invention allow the presence status to be used to determine the ON or OFF state of the cell phone wireless access point and/or whether the cell phone is an allowed access point for packet network access.

For example, presence based systems can define either or both of a user or device context for user availability. "Device" context defines a presence status of a particular device, such as a cell phone, etc. In some embodiments, device context may be Online, Away, Busy, Idle, and Be Right Back. In contrast, "identity" or "user" context may be defined as an aggregated presence of the user over one or more devices. An identity context thus may allow an identity to have an overall state that describes the work or non-work state that the identity is in. In some embodiments, the user or identity context may be In Office, Working Remote, Be Right Back, In Meeting, On Business Trip, Out of Office, On Vacation, Unavailable, and Unknown.

Figure 12:
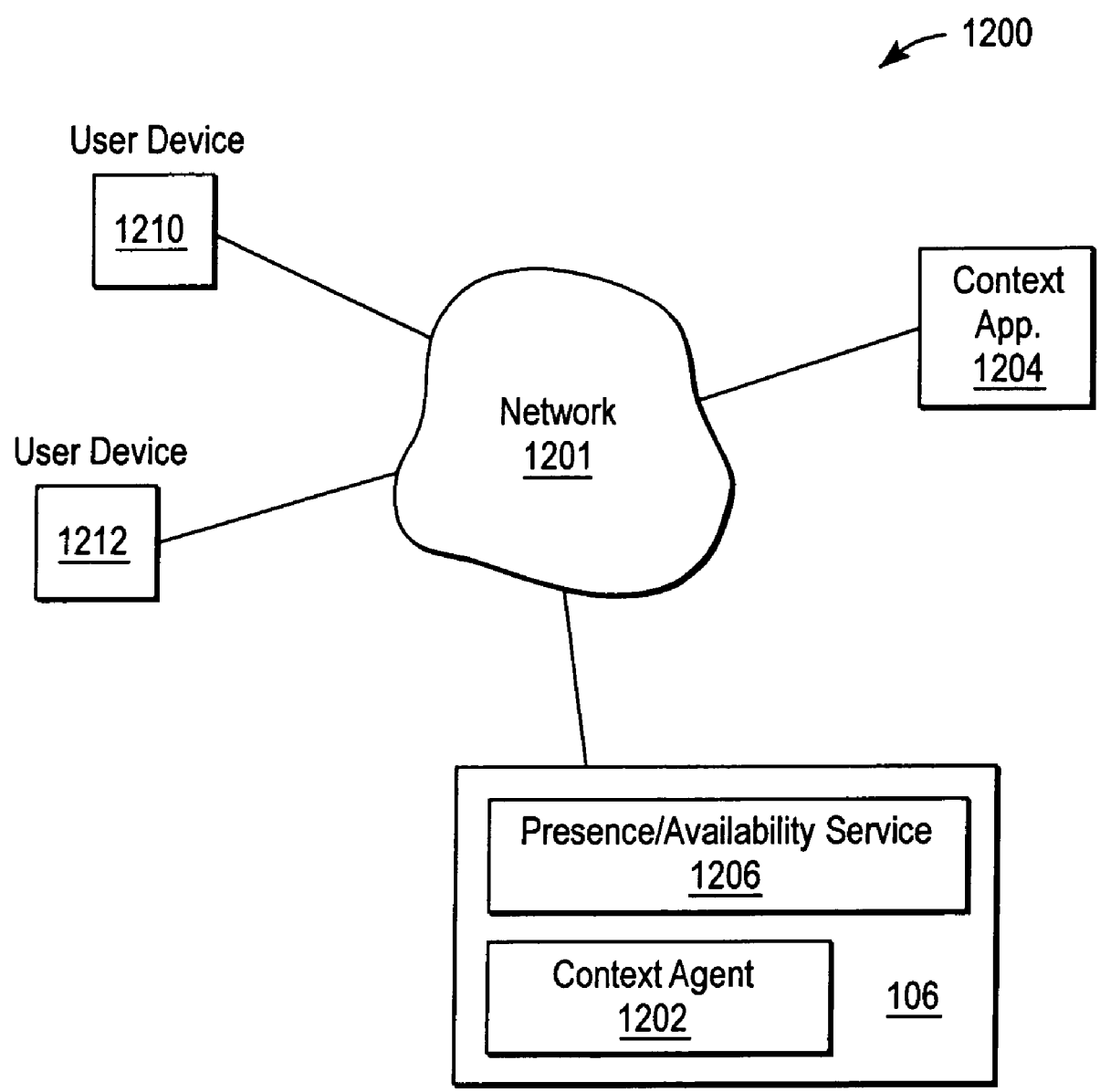
FIG. 12 is a diagram of a telecommunications system according to embodiments of the present invention.

Referring now to FIG. 12, an exemplary system 1200 is illustrated according to some embodiments. The system 1200 includes a context agent 1202 that may be connected to or in communication with a context or presence oriented application 1204 and a presence and availability service 1206. The context agent 1202 and presence and availability service 1206 may be implemented in server 106 (FIG. 1). An exemplary context agent and presence and availability service is the Openscape system available from Siemens Information and Communication Networks, Inc.

User devices, such as the user devices 1210, 1212, may be connected to or in communication with the context agent 1202. In some embodiments, a user device may be or include such things as telephones, cellular telephones, PDAs, computers, etc. For example, the user devices 1210, 1212, may be personal computers implementing the Windows XP™ operating system and the Windows Messenger™ instant messenger system, such as personal computer 110 (FIG. 1). In addition, the user devices 1210, 1212 may include telephony and other multimedia messaging capability using, for example, peripheral cameras, Webcams, microphones and speakers (not shown) or peripheral telephony handsets, such as the Optipoint™ handset available from Siemens Information and Communication Networks. For example, user devices may be implemented as cellular telephones 108 (FIG. 1).

In some embodiments, the system 1200 may include other hardware and/or software components (e.g., gateways, proxy servers, registration servers, presence servers, redirect servers, databases, applications), such as, for example, hardware and software used to support a SIP or other protocol based infrastructure for the system 1200 and allow registration of SIP devices in the system 1200.

The context agent 1202 may monitor the identity context of one or more identities and/or the device context of one or more devices. In some embodiments, the context agent 1202 may provide or include an application interface that supports identity context, device context, device presence, and/or other functions. Applications, such as context oriented application 1204, may monitor, access and/or query the context agent 1202 for identity context and/or device context information. An exemplary context oriented application may be a calendar application.

In some embodiments, the context agent 1202 may be able to receive, retrieve, or otherwise obtain information regarding an identity and/or a device associated with the identity, such as calendar information, schedule information, location information, configuration information, context information, etc.

In some embodiments, the context agent 1202 may provide the information to the context oriented application 1204 upon request, periodically, or in accordance with some other plan or procedure. In addition, in some embodiments, the context agent 1202 may provide information regarding device context. For example, an application may query the context agent 1202 to monitor or determine the device context of one or more devices. In some embodiments, an application may set or request a change for, either an identity context and/or a device context. For example, an application that sets an identity context for an identity to "in meeting" may set the device context for the identity's desk telephone to "offline" for both voicemail and instant messaging.

The context agent 1202 may be implemented in hardware and/or software operating on one or more servers, computer systems, host or mainframe computers, workstations, etc. In some embodiments the context agent 102 may be operating on some or all of the same device(s) as other components in the system 1200.

The network 1201 may be or include the Internet, the World Wide Web, a local area network, or some other public or private computer, cable, telephone, client/server, peer-to-peer, or communications network or intranet. In some embodiments, a communications network also can include other public and/or private wide area networks, local area networks, wireless networks, data communication networks or connections, intranets, routers, satellite links, microwave links, cellular or telephone networks, radio links, fiber optic transmission lines, ISDN lines, T1 lines, DSL connections, etc. Moreover, as used herein, communications include those enabled by wired or wireless technology. In some embodiments, some or all of the network 1201 may be implemented using a TCP/IP network and may implement voice or multimedia over IP using, for example, the Session Initiation Protocol (SIP).

According to particular embodiments of the present invention, the context oriented application is the personal computer 110's wireless network interface and/or the cellular telephone 108's mode control. As will be explained in greater detail below, depending on the user or device context, the cellular telephone wireless access point mode will be turned on and the personal computer 110 can be used to access the network via the cellular telephone.

Figure 13:
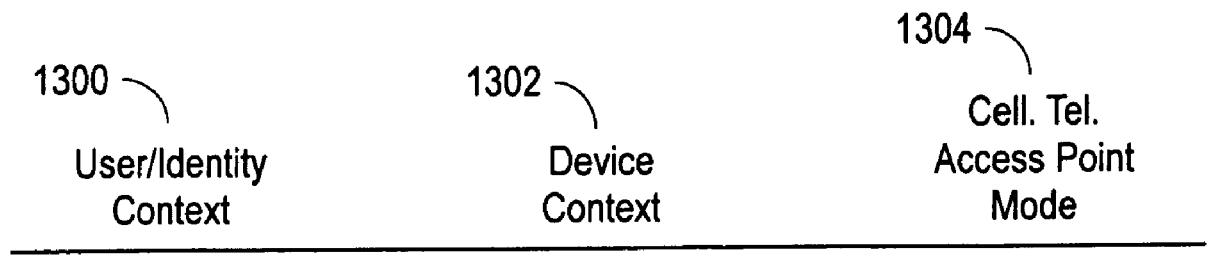
FIG. 13 is a table illustrating access portal availability based on presence status according to an embodiment of the present invention.

For example, FIG. 13 is a table illustrating identity or user context, and device context, and the corresponding wireless access point settings. More particularly, shown in column 1300 are exemplary identity or user contexts. Corresponding or alternative device contexts are shown in column 1302. A system and method for mapping between device and identity contexts is described in commonly assigned, co-pending U.S. patent application Ser. No. 10/673,522, titled "Method and System for Mapping Identity Context to Device Context," which is hereby incorporated by reference in its entirety as if fully set forth herein.

As shown, an Identity Context of "In Office" may be associated with a Device Context of "Online." The corresponding wireless access portal availability is maintained as OFF, even if the WiFi signal is stronger for the cell phone, because the user can access the network using a conventional access point. In operation, the computer 110 knows it need not search for the cellular wireless access point and can search for a standard WiFi connection and if found, connect. Otherwise, depending on the embodiment, the computer 110 can simply fail to connect, or can signal the cell phone that it wishes to connect; the cell phone 108 can then activate its network access point function.

If the Identity Context is "Out of Office," and corresponding device context is "Away," then the wireless access portal availability may be set to ON. That is, the cell phone will maintain the wireless access point as active. In this case, the computer 110 can either automatically log in through the cell phone wireless access point or be programmed to prompt the user as to whether he wishes such a log on. Alternatively, the computer will search for a public access point (or, e.g., an allowed listed one), but will then know to search for the cell phone access point. Other contexts are handled similarly.

Figure 14:
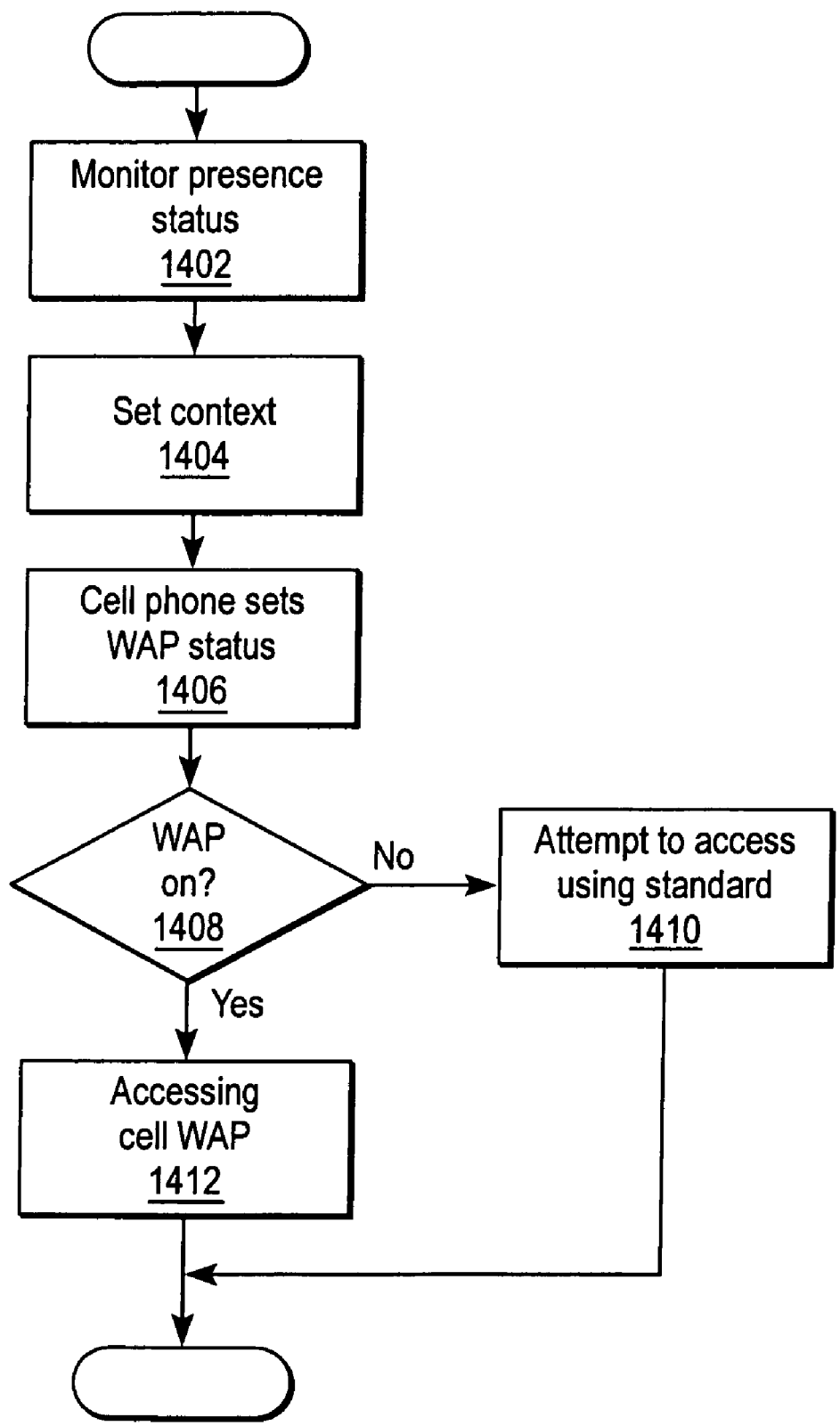
FIG. 14 is a flowchart illustrating operation of an embodiment of the present invention.

FIG. 14 is a flowchart illustrating operation of an embodiment of the present invention that uses the presence context to set the cellular wireless access point availability state. In a step 1402, the presence and availability service 1206 (FIG. 12) monitors user presence status. For example, the presence and availability service 1206 can determine if the user is presently engaged in an Instant Messaging session, or on the phone, etc. The presence and availability service 1206 provides the presence status to the context agent 1202, which sets the user and/or device context, in a step 1404. In a step 1406, a context oriented application 1204, such as the personal computer's wireless network access function 120, or the cell phone's wireless network interface 116 receives the context and sets the wireless access point setting. For example, the wireless network interface 504 could receive the context signaling. If the cell phone wireless access point function is set to ON, as shown in step 1408, then the user can access the network using his cell phone as an access point, as shown at step 1412. Otherwise, the user will first attempt to access the network using the standard wireless access points, as shown at step 1410.

It is noted that, while the above discussion has had the cell wireless access point function being turned on and off, it is equally possible to simply change the computer default access options or the list of available access points, based on presence/context. For example, when the user is out of office, the default setting could be a designated public access point, instead of first searching for the enterprise access point. If that isn't available, the cell phone access point can be used. Similarly, if the user is in the office, the default setting could be to use the local enterprise access point. Alternatively, the cell phone wireless access point could simply be removed from the list of options, or put last on the priority list, even if its signal strength is greater.

As noted above, in addition to using presence information to set the cell phone wireless access point state, the cell phone's state can itself be used to set the presence states. For example, in certain embodiments, the presence and availability service 1206 can detect the wireless access mode status of the cellular telephone. For example, the presence and availability service 1206 may monitor the server's telephone interface 114 (FIG. 1) to determine if it is in use. If it is in use, and the enterprise network is not otherwise being accessed by the user, then the presence state could be set to "Out of Office."

Figure 15:
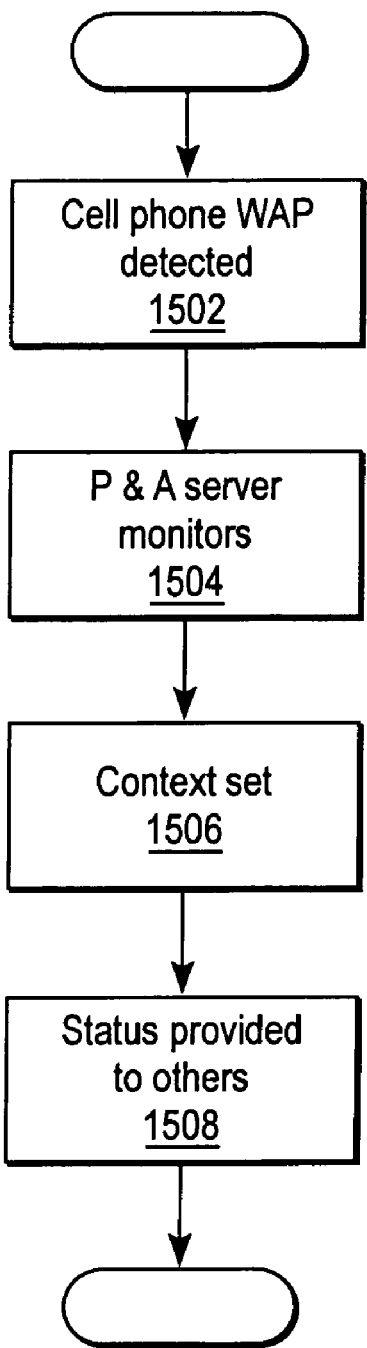
FIG. 15 is a flowchart illustrating operation of an embodiment of the present invention.

FIG. 15 is a flowchart illustrating operation of such an embodiment of the present invention. At a step 1502, the cell phone wireless access point function 506 is detected to be in use by the presence and availability service 1206. The presence and availability service monitors the state, in a step 1504, i.e., to determine if it is a changed state. The presence and availability service 1206 may, for example, also monitor the states of others of the users' devices. In a step 1506, if there is a change in state, the presence and availability service 1206 sends the new presence state to the context agent 1202. The context agent 1202 can then set the context and promulgate the presence information to other parties, such as those who have placed the user on their contact list(s), in a step 1508.

In addition to examining the cell phone wireless access point state to determine user presence states or contexts, the context agent 1202 can also receive inputs from other applications, such as context oriented applications 1204, although other applications may also provide useful data. For example application 1204 may be a calendar program, such as Microsoft Outlook, and can provide calendar information to be used in conjunction with the status information to derive the context. For example, if the cell phone access point indicates In Use, and the Outlook calendar indicates a meeting is scheduled, then the context can be set to "Working Remotely."

Figure 16:
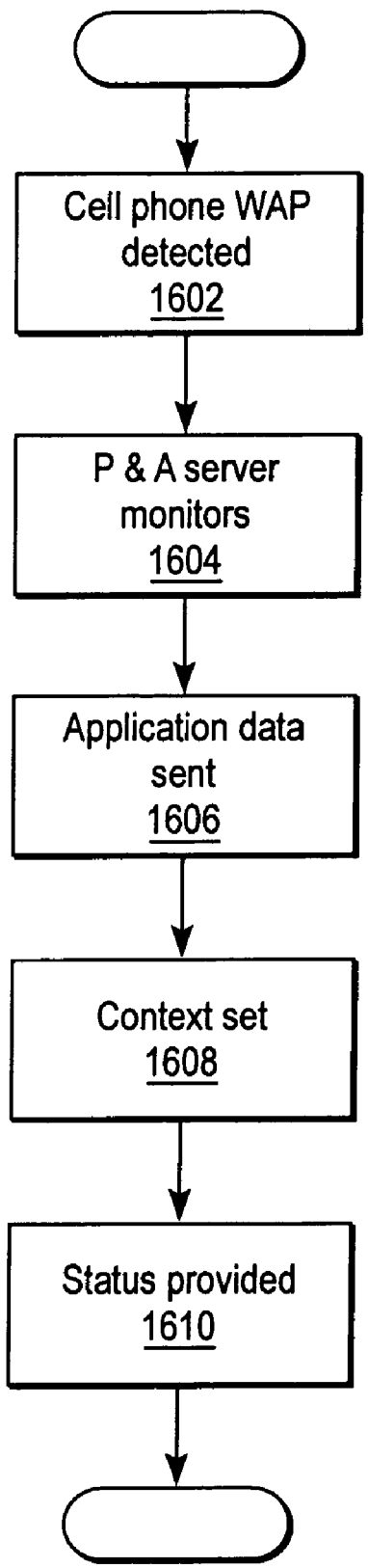
FIG. 16 is a block diagram of an exemplary server in accordance with embodiments of the present invention.

FIG. 16 is a flowchart illustrating operation of such an embodiment. Fin a step 1602, the cell phone wireless access point is detected as being in use. At a step 1604, the presence and availability service 1206 monitors the presence status of the user. At a step 1606, application data, such as calendar data, is sent to the context agent 1202, along with the presence data. In a step 1608, the context agent 1202 sets the user and/or device context. Finally, the context can be promulgated to other parties, in a step 1610.

Figure 17:
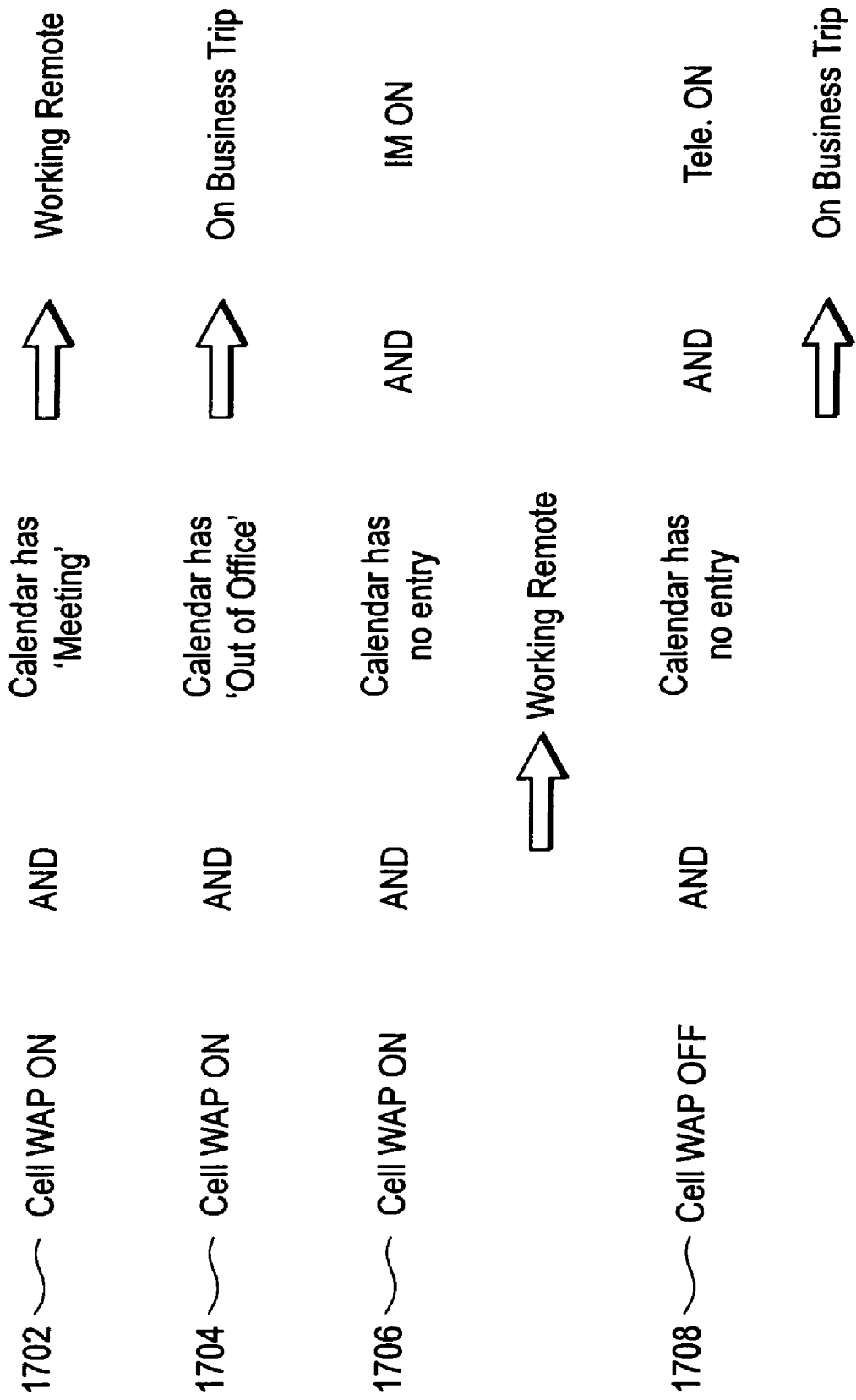
FIG. 17 is a table illustrating context rules according to an embodiment of the present invention.

FIG. 17 is a table listing several presence rules that may be applied with reference to the cell phone wireless access point state. It is noted that these rules are exemplary only. For example, at 1702, the cell phone wireless access point is indicated to be in the ON state and the calendar indicates there is a meeting for that time. Then, the user context can be set to "Working Remote." Similarly, at shown at 1704, if the cell phone wireless access point is indicated to be ON and the calendar shows the user is Out of Office, then the user context could be set to "On Business Trip." As shown at 1706, if the user's cell phone wireless access point is ON, the calendar has no entry, but another user is such as Instant Messaging is active, then the user context can be set to "Working Remote." If, as shown at 1708, the cell phone wireless access point is OFF and the calendar has no entry, but the cellular telephone is on, the context can be set to "On Business Trip."

Figure 18:
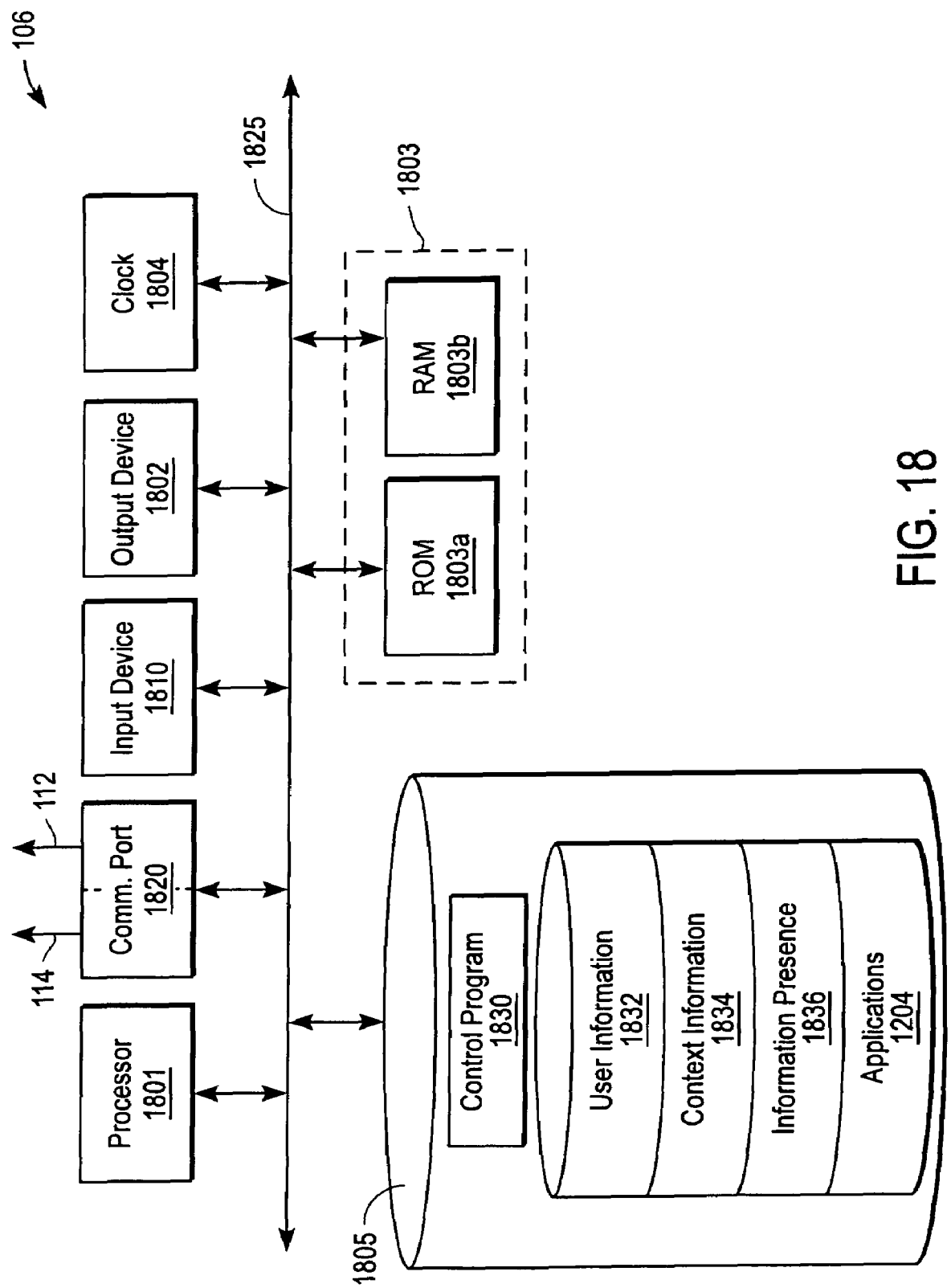
FIG. 18 is a block diagram of a server in accordance with an embodiment of the present invention.

Now referring to FIG. 18, a representative block diagram of a server or controller 106 is illustrated. In some embodiments, the server 106 may include or operate a context oriented application, the context agent 102, and/or the presence and availability service 106. In addition, the server 106 may implement telephone network and packet network interfaces. The server 106 may be embodied as a single device or computer, a networked set or group of devices or computers, a workstation, mainframe or host computer, etc. In some embodiments, the server 106 may implement one more elements of the methods disclosed herein.

The server 106 may include a processor, microchip, central processing unit, or computer 1801 that is in communication with or otherwise uses or includes one or more communication ports 1820 for communicating with user devices and/or other devices. The communication ports 1820 may include such things as local area network adapters, wireless communication devices, Bluetooth technology, etc. In one embodiment, communication ports 1820 can be used as a network interface 112 to interface to the packet network 102; other communication ports 1820 can be used as telephone interfaces 114 to interface to the telephone network. The server 106 also may include an internal clock element 1804 to maintain an accurate time and date for the server 106, create time stamps for communications received or sent by the server 106, etc.

If desired, the server 106 may include one or more output devices 1802 such as a printer, infrared or other transmitter, antenna, audio speaker, display screen or monitor, text to speech converter, etc., as well as one or more input devices 1810 such as a bar code reader or other optical scanner, infrared or other receiver, antenna, magnetic stripe reader, image scanner, roller ball, touch pad, joystick, touch screen, microphone, computer keyboard, computer mouse, etc.

In addition to the above, the server 106 may include a memory or data storage device 1805 to store information, software, databases, documents, communications, device drivers, etc. The memory or data storage device 1805 may be implemented as an appropriate combination of magnetic, optical and/or semiconductor memory, and may include, for example, Read-Only Memory (ROM), Random Access Memory (RAM), a tape drive, flash memory, a floppy disk drive, a Zip™ disk drive, a compact disc and/or a hard disk. The server 106 also may include memory 1803, such as ROM and RAM.

The processor 1801 and the data storage device 1805 in the server 106 each may be, for example: (i) located entirely within a single computer or other computing device; or (ii) connected to each other by a remote communication medium, such as a serial port cable, telephone line or radio frequency transceiver. In one embodiment, the server 106 may be implemented as one or more computers that are connected to a remote server computer for maintaining databases.

A conventional personal computer or workstation with sufficient memory and processing capability may be used as the server 106. The server 106 may be capable of high volume transaction processing, performing a significant number of mathematical calculations in processing communications and database searches. A Pentium™ microprocessor such as the Pentium III™ or IV™ microprocessor, manufactured by Intel Corporation may be used for the processor 1801. Other suitable processors may be available from Motorola, Inc., AMD, or Sun Microsystems, Inc. The processor 1801 also may be embodied as one or more microprocessors, computers, computer systems, etc.

Software may be resident and operating or operational on the server 106. The software may be stored on the data storage device 1805 and may include a control program 1830 for operating the server, databases, etc. The control program 1830 may control the processor 610. The processor 610 may perform instructions of the control program 626, and thereby operate in accordance with the methods described in detail herein. The control program 1830 may be stored in a compressed, uncompiled and/or encrypted format. The control program 1830 furthermore includes program elements that may be necessary, such as an operating system, a database management system and device drivers for allowing the processor 1801 to interface with peripheral devices, databases, etc. Appropriate program elements are known to those skilled in the art, and need not be described in detail herein.

The server 106 also may include or store information regarding identities, user devices, contexts, presence information, communications, etc. For example, information regarding one or more identities may be stored in an identity information database 1832 for use by the server 106 or another device or entity. Information regarding one or more identity or device contexts may be stored in a context information database 1834 for use by the server 106 or another device or entity; information regarding presence rules may be stored in a presence information database 1836 for use by the server 106 or another device or entity; and information regarding other application program data may be stored in application database 1204. In some embodiments, some or all of one or more of the databases may be stored or mirrored remotely from the server 106.

According to some embodiments, the instructions of the control program may be read into a main memory from another computer-readable medium, such as from the ROM to the RAM. Execution of sequences of the instructions in the control program causes the processor 1801 to perform the process elements described herein. In alternative embodiments, hard-wired circuitry may be used in place of, or in combination with, software instructions for implementation of some or all of the methods described herein. Thus, embodiments are not limited to any specific combination of hardware and software.

The processor 1801, communication ports 1820, clock 1804, output device 1802, input device 1810, data storage device 1805, ROM and RAM may communicate or be connected directly or indirectly in a variety of ways. For example, the processor 1801, communication ports 1820, clock 1804, output device 1802, input device 1810, data storage device 1805, ROM and RAM may be connected via a bus 1825.

While specific implementations and hardware/software configurations for the server 106 have been illustrated, it should be noted that other implementations and hardware configurations are possible and that no specific implementation or hardware/software configuration is needed. Thus, not all of the components illustrated in FIG. 18 may be needed for the server 106 implementing the methods disclosed herein.

The methods described herein may be embodied as a computer program developed using an object oriented language that allows the modeling of complex systems with modular objects to create abstractions that are representative of real world, physical objects and their interrelationships. However, it would be understood by one of ordinary skill in the art that the invention as described herein could be implemented in many different ways using a wide range of programming techniques as well as general-purpose hardware systems or dedicated controllers. In addition, in some embodiments, many, if not all, of the elements for the methods described above are optional or can be combined or performed in one or more alternative orders or sequences and the claims should not be construed as being limited to any particular order or sequence, unless specifically indicated.

Each of the methods described above can be performed on a single computer, computer system, microprocessor, etc. In addition, in some embodiments, two or more of the elements in each of the methods described above could be performed on two or more different computers, computer systems, microprocessors, etc., some or all of which may be locally or remotely configured. The methods can be implemented in any sort or implementation of computer software, program, sets of instructions, programming means, code, ASIC, or specially designed chips, logic gates, or other hardware structured to directly effect or implement such software, programs, sets of instructions, programming means or code. The computer software, program, sets of instructions or code can be storable, writeable, or savable on any computer usable or readable media or other program storage device or media such as a floppy or other magnetic or optical disk, magnetic or optical tape, CD-ROM, DVD, punch cards, paper tape, hard disk drive, Zip™ disk, flash or optical memory card, microprocessor, solid state memory device, RAM, EPROM, or ROM.

The invention described in the above detailed description is not intended to be limited to the specific form set forth herein, but is intended to cover such alternatives, modifications and equivalents as can reasonably be included within the spirit and scope of the appended claims.

What is claimed is:

1. A telecommunications system, comprising:
   a wireless packet network;
   a cellular telephone network;
   at least one computing device including a wireless network interface card for communicating over the wireless packet network;
   at least one cellular telephone device, the cellular telephone device having a cellular telephone mode for communicating over the cellular telephone network and a wireless packet network mode for communicating over the wireless packet network;
   a presence server on said wireless packet network;
   wherein the cellular telephone device is configured to function in wireless packet network mode as a wireless access point for said at least one computing device by interfacing the wireless network interface card to the wireless packet network via the cellular network;
   wherein the presence server communicates with said at least one cellular telephone device to activate and deactivate said wireless packet network mode based on a presence status, the cellular telephone functioning as a wireless access controller when said wireless packet network mode is activated.

2. A telecommunications system in accordance with claim 1, wherein the cellular telephone network comprises a GPRS network.

3. A telecommunications system in accordance with claim 1, wherein the wireless packet network comprises the Internet.

4. A telecommunications system in accordance with claim 1, wherein the wireless packet network comprises a wireless local area network.

5. A wireless telephone, comprising:
   a cellular telephone controller configured to interface the wireless telephone to a cellular telephone network;
   a wireless packet network controller configured to interface the wireless telephone to one or more packet networks for voice over IP voice connection; and
   a wireless network access point controller configured for the wireless telephone to function as a wireless access point for interfacing a computer to said packet network via the cellular telephone network;
   wherein the wireless packet network controller is configured to turn on and off a function of the wireless network access point controller responsive to a presence status of a user, the wireless telephone functioning as a wireless access controller when said wireless packet network controller is turned on.

6. A wireless telephone in accordance with claim 5, wherein a presence status of a user is received at said telephone via the wireless packet network controller.

7. A wireless telephone in accordance with claim 5, wherein said wireless packet network is an 802.11 wireless network.

8. A wireless telephone in accordance with claim 5, wherein said wireless packet network is a wireless Internet.

9. A wireless telephone in accordance with claim 5, wherein said cellular telephone network includes a GPRS cellular network.

10. A wireless telephone in accordance with claim 5, wherein said wireless packet network controller is configured to turn on and off a function of the wireless network access point controller responsive to said presence status of a user, overriding a signal strength connection measure.

11. A wireless telephone having a voice over IP controller for voice communication over a packet network and a cellular network controller for voice communication over a cellular telephone network, the wireless telephone configured to function as a cellular wireless network interface to said packet network, wherein said wireless telephone is configured to implement a wireless access point function so as to interface a computer equipped with a wireless network interface to said packet network via the cellular telephone network;

wherein said voice over IP controller is configured to turn on and off said wireless access point function, coupling the computer to said packet network responsive to a presence status of a user.

12. A wireless telephone in accordance with claim 11, wherein said IP controller is configured to turn on and off the wireless network access point function responsive to said presence status of a user, overriding a signal strength connection measure.

13. A wireless telephone in accordance with claim 11, wherein said packet network is an 802.11 wireless network.

14. A wireless telephone in accordance with claim 11, wherein said packet network is a wireless Internet.

15. A wireless telephone in accordance with claim 11, wherein said cellular telephone network includes a GPRS cellular network.

16. A telecommunications method, comprising:
   using an 802.11 interface in a cellular telephone to provide a wireless network access point for a computer;
   connecting said cellular telephone to a packet network through a cellular telephone network using a cellular telephone network protocol; and
   using said 802.11 interface to search said packet network for available 802.11 network access points and turn on and off said wireless network access point function on said cellular telephone responsive to a user presence indication.

17. A telecommunications method in accordance with claim 16, further comprising using said 802.11 interface to turn off said network access point function even if a signal strength priority indicates the wireless network access point function on said cellular telephone is the currently optimal network access point.

18. A telecommunications method in accordance with claim 17, wherein said using said 802.11 interface to provide said wireless network access point for said computer comprises interfacing to the computer using an 802.11 protocol and interfacing to a packet network using said cellular network protocol.

19. A telecommunications method in accordance with claim 16, wherein said cellular network protocol comprises a GPRS protocol.

* * * * *